(12) United States Patent
Vishwanath et al.

(10) Patent No.: US 6,671,416 B2
(45) Date of Patent: *Dec. 30, 2003

(54) METHOD FOR TRANSMITTING DATA USING AN EMBEDDED BIT STREAM PRODUCED IN A HIERARCHICAL TABLE-LOOKUP VECTOR QUANTIZER

(75) Inventors: Mohan Vishwanath, San Jose, CA (US); Philip A. Chou, Bellevue, WA (US); Navin Chaddha, Bellevue, WA (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,991

(22) Filed: Jul. 30, 2001

(65) Prior Publication Data

US 2002/0034333 A1 Mar. 21, 2002

Related U.S. Application Data

(63) Continuation of application No. 09/015,138, filed on Jan. 29, 1998, now Pat. No. 6,345,126.

(51) Int. Cl.[7] .................................................. G06K 9/36
(52) U.S. Cl. ................... 382/253; 382/240; 375/240.22
(58) Field of Search ............................... 382/232–233, 382/240, 244, 251, 253; 375/240.03, 240, 240.24, 240.25, 240.27, 240.22, 240.11, 240.12, 240.19, 240.2, 240.06

(56) References Cited

U.S. PATENT DOCUMENTS

| | | | |
|---|---|---|---|
| 4,718,104 A | 1/1988 | Anderson | 382/240 |
| 5,060,285 A | 10/1991 | Dixit et al. | 382/253 |
| 5,128,756 A | 7/1992 | Johnston et al. | 375/240.12 |
| 5,231,485 A * | 7/1993 | Israelsen et al. | 375/240.03 |
| 5,272,529 A | 12/1993 | Frederiksen | 375/240.22 |
| 5,321,776 A | 6/1994 | Shapiro | 382/240 |
| 5,398,069 A | 3/1995 | Huang et al. | 375/240.22 |
| 5,412,741 A | 5/1995 | Shapiro | 382/232 |
| 5,477,272 A | 12/1995 | Zhang et al. | 375/240.06 |
| 5,602,589 A | 2/1997 | Vishwanath et al. | 375/240.11 |
| 5,649,030 A | 7/1997 | Normile et al. | 382/253 |
| 5,692,012 A | 11/1997 | Virtamo et al. | 375/240 |
| 5,822,465 A | 10/1998 | Normile et al. | 382/253 |
| 5,926,226 A | 7/1999 | Proctor et al. | 375/240.22 |
| 6,154,572 A * | 11/2000 | Chaddha | 382/253 |
| 6,345,126 B1 * | 2/2002 | Vishwanath et al. | 382/253 |

FOREIGN PATENT DOCUMENTS

WO 97/36376 10/1997 ............ H03M/7/30

OTHER PUBLICATIONS

Po et al., Adaptive Dimensionality Reduction Techniques for Tree–Structured Vector Quantization, IEEE 0090–6778/94, 2246–2257.*

J.M. Shapiro, "Embedded Image Coding Using Zerotrees of Wavelet Coefficients," IEEE Trans. on Signal Processing, vol. 41, No. 12, pp. 3445–3462 (Dec. 1993).

D. Taubman and A. Zakhor, "Multi–Rate 3–D Subband Coding of Video," IEEE Trans. Image Proc., vol. 3, No. 5, pp. 572–588 (Sep. 1994).

(List continued on next page.)

Primary Examiner—Leo Boudreau
Assistant Examiner—Ishrat Sherali
(74) Attorney, Agent, or Firm—Fay, Sharpe, Fagan, Minnich & McKee, LLP

(57) ABSTRACT

A transmission method for video image data using an embedded bit stream in a hierarchical table-lookup vector quantizer comprises the steps encoding an image using hierarchical vector quantization and an embedding process to obtain an embedded bit stream for lossless transmission. The bit stream is selectively truncated and decoded to obtain a reconstructed image.

14 Claims, 10 Drawing Sheets

OTHER PUBLICATIONS

E.A. Riskin, T. Lookabaugh, P.A. Chou, and R.M. Gray, "Variable Rate Vector Quantization for Medical Image Compression," IEEE Trans. Medical Imaging, vol. 9, No. 3, pp. 290–298 (Sep. 1990).

W.-J. Hwang and H. Derin, "Multi–Resolution Multi–Rate Progressive Image Transmission," Proc. 27th Asilomar Conf. on Signals, Systems, and Computers, Pacific Grove, CA, pp. 65–69 (Nov. 1–3, 1993).

M. Effros, P.A. Chou, E.A. Riskin, and R.M. Gray, "A Progressive Universal Noiseless Coder," IEEE Trans. Information Theory, vol. 40, No. 1, pp. 108–117 (Jan. 1994).

P.-C. Chang, J. May, and R.M. Gray, "Heirarchical Vector Quantization with Table–Lookup Encoders," Proc. Int'l. Conf. on Communications, Chicago, IL, pp. 1452–1455 (Jun. 1985).

N. Chaddha, M. Vishwanath, and P.A. Chou, "Hierarchical Vector Quantization of Perceptually Weighted Block Transforms," Proc. Data Compression Conference, Snowbird, UT (Apr. 1995).

M. Vishwanath and P.A. Chou, "An Efficient Algorithm for Hierarchical Compression of Video," Proc. Int'l. Conf. on Image Processing, Austin, TX, vol. 3, pp. 275–279 (Nov. 1994).

N. Chaddha, P.A. Chou, and T.H.-Y. Meng, "Scalable Compression based on Tree Structured Vector Quantization of Perceptually Weighted Block, Lapped, and Wavelet Transforms," Proc. IEEE Int'l Conf. on Image Processing, Washington, DC, pp. 89–92 (Oct. 23–26, 1995).

Mark W. Garrett and Martin Vetterli, "Joint Source/Channel Coding of Statistically Multiplexed Real–Time Services on Packet Networks," IEEE/ACM Transactions on Networking, vol. 1, No. 1, pp. 71–80 (Feb. 1993).

Pao–Chi Chang, "Predictive Heirarchical, and Transform Vector Quantization for Speech Coding," Information Systems Laboratory, Stanford Electronics Laboratories, Department of Electrical Engineering, Stanford, CA (May 1986).

Mohan Vishwanath, Robert M. Owens and Mary Jane Irvin, "VLSI Architectures for the Discrete Wavelet Transform," Proceedings of Application Specific Array Processors (ASAP) (1992) and IEEE VLSI Sig. Proc. Wkshp. (1992).

Mohan Vishwanath and Chaitali Chakrabarti, "A VLSI Architecture for Real–Time Hierarchical Encoding/Decoding of Video Using the Wavelet Transform," International Conference on Acoustic, Speech and Signal Processing (ICASSP) (1993).

Oral Statement (on or about Oct. 27, 1995) identified and described in the accompanying Information Disclosure Statement.

Jerome M. Shapiro, "An Embedded Wavelet Hierarchical Image Coder," *IEEE*, pp. IV–657–IV–660 (Mar. 23, 1992).

Hang Wang et al., "Efficient Image Coding Method Based on Adaptive Gabor Discrete Cosine Transforms," *Journal of Electronic Imaging*, vol. 2(1), pp. 38–43 (Jan. 1993).

Mohan Vishwanath et al., "A VLSI Architecture for Real–Time Hierarchical Encoding/Decoding of Video Using the Wavelet Transform," *IEEE*, pp. II–401–II–404 (Apr. 19, 1994).

Oral Statement (on or about Oct. 27, 1995) identified and described in the accompanying Information Disclosure Statement.

* cited by examiner

METHOD FOR TRANSMITTING DATA USING AN EMBEDDED BIT STREAM PRODUCED IN A HIERARCHICAL TABLE-LOOKUP VECTOR QUANTIZER

This application is a continuation of U.S. Ser. No. 09/015,138 filed Jan. 29, 1998.

BACKGROUND OF THE INVENTION

This invention relates to a method for producing an embedded bit stream in a hierarchical table lookup vector quantizer for use in connection with image data compression wherein an image is encoded at a transmitter, transmitted, and/or selectively decoded at a receiver. An embedded bit stream is one in which any prefix of the bit stream is a valid bit stream of the image at a lower rate. The present invention provides transcoding to bit streams of arbitrary lower rate, simply by truncation. Thus, image data can be transmitted in an embedded bit stream and the receiver can use as much of the embedded bit stream as is necessary to reconstruct the image to a desired or allowable resolution. That is, the invention implements progressive decoding of bit streams to images with increasing resolution as bits arrive at the receiver.

While the invention is particularly directed to the art of image data compression, and will thus be described with specific reference thereto, it will be appreciated that the invention has applicability to other media, such as video and audio. Exemplary applications to such media include packet prioritization for bandwidth scalability in networks, information prioritization for unequal error protection for wireless communication, and arbitrarily fine bit rate control at the encoder.

By way of background, image and video coding standards such as JPEG, MPEG, and MPEG-II are based on transform coding. In transform coding, a block transform such as the discrete cosine transform (DCT) is typically applied to 8×8 blocks of an image, and each transform coefficient or frequency b d is independently quantized. The quantization stepsizes typically vary from band to band, with larger stepsizes in the higher frequency bands reflecting the fact that quantization errors at higher spatial frequencies are visually less apparent.

JPEG has a progressive transmission mode, in which an image is stored or transmitted with the most significant bits first, then the next most significant bits, and so on. This is accomplished by beginning with large stepsizes for each band, and successively halving the stepsizes in selected bands in some sequence. As each stepsize is halved, additional bits are stored or transmitted. The resulting bit stream is said to be embedded in the sense that any prefix of the bit stream can be decompressed into an image whose quality is appropriate for the length of the prefix. That is, lower resolution encodings are embedded in higher resolution encodings. Such an embedded bit stream is useful, for example, in image retrieval or telebrowsing applications in which the user must scan through a large collection of images to find a desired image, and it is too expensive or time-consuming to reproduce all the images in full detail. In these applications, the decoder can progressively reconstruct images of improving quality as bits arrive.

Most research on image and video coding algorithms still focuses on variants of transform coding. In particular, the transform is often based on wavelet analysis, subband filtering, or lapped orthogonal transforms, for which the transform blocks overlap, thereby reducing objectionable blocking artifacts.

J. M. Shapiro, "Embedded Image Coding Using Zerotrees of Wavelet Coefficients," IEEE Trans. on Signal Processing, Vol. 41, No. 17, pp. 3445–3463, December 1993, and D. Taubman and A. Zakhor, "Multi-Rate 3-D Subband Coding of Video," IEEE Trans. Image Proc., Vol. 3, No. 5, pp. 572–588, September 1994, employ wavelet transform coding in a progressive mode. Taubman uses the resulting embedded bit stream for simple bit rate control in a video encoder. Bit rate control is essential when coupling a Ad variable-rate data compressor to a fixed-rate channel. If the channel can transmit exactly (or a maximum of) B bits per second, then the bit rate of the compressor must be decreased or increased when the buffer between the compressor and channel begins to overflow or underflow, respectively. With an embedded bit stream, bit rate control becomes as simple as taking a prefix of an appropriate length from the encoding for each frame (or other unit) of the video data.

Vector quantization is a generalization of simple (scalar) quantization, in which each vector of coefficients is simultaneously quantized using a small number of bits, e.g. 8, to represent the vector as the index of one of, for example, 256 possible reproduction vectors (called codewords) in a collection of reproduction vectors (called the codebook). A special case of vector quantization is scalar quantization applied independently to each component of a vector. The codewords in this case are constrained to lie on a rectangular lattice. In vector quantization, this constraint is removed. Hence vector quantization is superior to scalar quantization in that it can arrange the codewords in the vector space for maximum coding efficiency. For example, the codewords can be arranged to populate only the probable regions of the space. This can be accomplished using a training set of typical data and a clustering algorithm. See A. Gersho and R. M. Gray, "Vector Quantization and Signal Compression," Kluwer Academic Publishers, 1992.

Not only do vector quantizers have superior rate-distortion performance; they also permit decoding by simple table lookup. When the decoder receives an 8 bit code, for example, it reproduces the original vector by using the code as the index to a table, and reading the reproduction vector out of the table. If all the coefficients of a block transform are blocked into a single vector, the decoder can decode the whole block with a simple table lookup. No inverse transform is necessary in this case, as it would be if the components of the transform were scalar quantized.

Unfortunately, there are some drawbacks to vector quantization. The first is encoder complexity. Since the codebook is unstructured, for each input vector, the encoder must perform a full search through the codebook looking for the codeword that would result in the lowest distortion. This is often excessively time-consuming for practical algorithms. A second related problem is that for a given bit rate (in bits per component), the number of bits per vector grows linearly with vector dimension, and hence the number of codewords grows exponentially with vector dimension (and hence so does encoder complexity, and encoder and decoder memory requirements). As a practical consequence, the vector dimension must match the bit rate. At low bit rates, large vector dimensions are feasible. At higher bit rates, only small dimensions may be feasible. At the highest bit rates, only scalar quantization may be feasible. At any given bit rate, the best rate-distortion performance will be attained with the largest feasible vector dimensions.

To reduce the computational complexity of searching the codebook of a vector quantizer, a number of alternatives have been developed. One of these is tree-structured vector quantization. In tree-structured vector quantization, the codewords are arranged in a tree structure (typically a binary tree), with one codeword at each node. Instead of searching the codebook exhaustively, it can be searched in a time logarithmic fashion by beginning at the root node, successively comparing the input vector to the codewords at each branch node, descending to the branch with the lower distortion, and repeating the process until reaching a leaf node. The codeword at the leaf is the desired reproduction vector and is represented by a binary code for the leaf, 8 bits to specify one of 256 leaves, for example. If the tree is complete, that is, if all leaves are at the same depth, (e.g. 8), then the path map to the leaf may be used as its index.

The path map has the embedded code property: any prefix represents a reproduction vector in a coarser codebook, i.e., at a higher level in the tree. Trees whose leaves are at varying depths result in a variable-rate code, in which the binary strings used to represent the reproduction vector vary in length depending on the input vector. Since fixed-rate codes are a special case of variable-rate codes, variable-rate codes can always do at least as well as fixed-rate codes (typically 20–30% better), at the cost of extra delay due to buffering, and reduced tolerance to bit errors.

The embedded coding property applies to variable-rate tree-structured vector quantizers as well as fixed-rate quantifers. E. A. Riskin, T. Lookabaugh, P. A. Chou, and R. M. Gray, "Variable-Rate Vector Quantization for Medical Image Compression," IEEE Trans. Medical Imaging, Vol. 9, No. 3, pp. 290–298, September 1990; W. -J. Hwang and H. Derin, "Multi-Resolution Multi-Rate Progressive Image Transmission," Proc. 27th Asilomar Conf. on Signals, Systems, and Computers, Nov. 1–3, 1993. Pacific Grove, Calif., pp. 65–69; and, M. Effros, P. A. Chou, E. A. Riskin, and R. M. Gray, "A Progressive Universal Noiseless Coder," IEEE Trans. Information Theory, Vol. 40, No. 1, pp. 108–117, January 1994, explore variable-rate tree-structured vector quanitization for progressive image transmission. In the latter work, the tree-structured vector quantizer is structured so that the codewords lie on a rectangular lattice. As a result, the complete tree represents the input vector losslessly. Thus the progressive transmission sequence results in a lossless coding.

Another method developed for reducing the full search encoding complexity of unstructured vector quantization is hierarchical table-lookup vector quanitization, developed by P.- C. Chang, J. May, and R. M. Gray, "Hierarchical Vector Quantization with Table-Lookup Encoders," Proc. Int'l. Conf. on Communications, Chicago, Ill., June 1985, pp. 1452–55. In hierarchical table-lookup vector quanitization, a hierarchy of moderately sized tables (e.g., 64 Kbytes) is used to perform the encoding. (Decoding is performed as usual in vector quantization, by a single table lookup.) For example, with reference FIG. 1a, to encode an 8-dimensional input vector into 8 bits, each component is first finely quantized to 8 bits, or one byte (this is usually already the case in image coding). Then each of the 4 adjacent pairs of bytes is used to address a 16-bit table (Table 1), to produce one byte for each pair. This process is repeated in two additional levels of the hierarchy, resulting in a single byte for the 8-dimensional input vector.

Each Table 1, 2 and 3 is 64 Kbytes. The number of tables is the logarithm of the vector dimension. The computational complexity of the scheme is at most one table lookup per input symbol, since the complexity of the first level is ½ table lookup per input symbol, the complexity of the second level is ¼ table lookup per input symbol, and so on. Each table lookup implements, approximately, the equivalent of an encoder full search unstructured vector quantizer. Table 1 encodes each possible 2-dimensional vector (or rather, each of 64K possible pairs of bytes) to the index of the best or lowest distortion codeword in a 2-dimensional codebook of the size 256. Table 2 encodes each possible 4-dimensional vector (or rather, each of the 64K possible 4-dimensional vectors reproducible after the first level of quantization) to the index of the best or lowest distortion codeword in a 4-dimensional codebook of the size 256, and so on for each level.

A signal flow diagram for such an HVQ encoder is shown in FIG. 1b. In the HVQ of FIG. 1b, the tables T at each stage of the encoder along with the delays Z are illustrated. Each level in the hierarchy doubles the vector dimension of the quantizer, and therefore reduces the bit rate by a factor of 2. By similar reasoning, the ith level in the hierarchy performs one lookup per $2^i$ samples, and therefore the total number of lookups per sample is at most $½+¼+⅛+\ldots=1$, regardless of the number of levels. Of course, it is possible to vary these calculations by adjusting the dimensions of the various tables.

The contents of the HVQ tables can be determined in a variety of ways. A straightforward way is the following. With reference to FIG. 1a, Table 1 is simple a table-lookup version of an optimal 2-dimensional VQ. That is, an optimal 2-dimensional full search vector quantizer with M=256 codewords is designed by standard means (e.g., the generalized Lloyd algorithm discussed by A. Gersho and R. M. Gray, "Vector Quantization and Signal Compression," Kluwer Academic Publishers, 1992), and Table 1 is filled so that it assigns to each of its $2^{16}$ possible 2-dimensional input vectors the 8-bit index of the nearest codeword.

Table 2 is just slightly more complicated. First, an optimal 4-dimensional full search VQ with M=256 codewords is designed by standard means. Then Table 2 is filled so that it assigns to each of its $2^{16}$ possible 4-dimensional input vectors (i.e., the cross product of all possible 2-dimensional output vectors from the first stage) the 8-bit index of its nearest codeword. The tables for stages 3 and up are designed similarly. Note that the distortion measure is completely arbitrary.

This same structure may be used for vector quantization of the coefficients in a block transform (such as a discrete cosine transform, DCT). In this case, the transform computation may be embodied in the table lookups, as studied by N. Chaddha, M. Vishwanath, and P. A. Chou, "Hierarchical Vector Quantization of Perceptually Weighted Block Transforms," Proc. Data Compression Conference, Snowbird, Vt., April 1995. A sliding window version of the structure may be used for vector quantization of the coefficients of wavelet, subband, or lapped transforms, as studied by M. Vishwananth and P. A. Chou, "An Efficient Algorithm for Hierarchical Compression of Video," Proc. Int'l. Conf. on Image Processing, Austin, Tex., Nov. 1994, Vol. 3, pp. 275–279. In this case as well, the transform computation is embodied in the tables. It is also a simple matter to embody arbitrary perceptual distortion measures in the tables.

Thus, hierarchical vector quantization offers both extremely low computational complexity and good rate-distortion performance. It also offers a simple means of transcoding (reformatting) the bit stream at rate R bits per second to another bit stream at rate R/2 (or R/4, R/8, etc.) bits per second by further table-lookups to map each pair of bytes into a single byte. In M. Vishwananth and P. A. Chou, "An Efficient Algorithm for Hierarchical Compression of Video," Proc. Int'l. Conf. on Image Processing, Austin, Tex., November 1994, Vol. 3, pp. 275–279, it was argued that such simple transcoding would be useful for reducing the bit rate of the compressed signal at gateways between high and low capacity networks.

Unfortunately, transcoding by table lookup is not simple enough for certain applications. It is undesirable to place application-dependent algorithms (such as table look-ups for video coding) at network gateways or switches. Embedded coding is a simpler way, not dependent on the application, for the gateway to transcode from high rate to low rate streams. Equivalently, receivers on the low rate network can subscribe to only the high priority streams. This is called bandwidth scalability. If an embedded bit stream is packaged into prioritized bit streams, then the gateway need only pass on to the low rate network the high priority streams. No application-specific processing is done at the gateway. A gateway node need only be able to threshold packet numbers, which is a capability that will most likely be present in future network protocols.

Another use of embedded coding, or prioritized bit streams, in a packet network is congestion control. As packet buffers overflow, low priority packets can be dropped, and the signal reconstructed from the remaining packets will be gracefully degraded. A similar idea applies to wireless communications. If packets of information are prioritized, then it is possible to use unequal error protection on the different packets. That is, the highest priority packets will be channel coded for maximum error protection, and the lowest priority packets may not have any error correction applied, before modulation and transmission. The encoder need not have any particular knowledge of packet loss or channel characteristics. It need only rank bits in terms of priority.

A final use of embedded coding, particularly for fixed-rate networks, is for rate control, as mentioned above. Many of these uses of embedded coding are simultaneously applicable.

The present invention contemplates a new and improved image data transmission method which resolves the shortcomings of prior schemes.

SUMMARY OF THE INVENTION

A method for encoding and decoding an image is provided. The method, which is implemented in a complementary apparatus, comprises receiving an image and performing an encoding process involving hierarchical table lookup vector quantization on blocks of the image and embedding resultant data to obtain an embedded bit stream of data representing the image. Any selected prefix of the bit stream represents a valid bit stream of the image at a lower rate than the entire bit stream.

In accordance with another aspect of the present invention, the embedded bit stream is transmitted to a receiver.

In accordance with another aspect of the present invention, the transmitted bit stream may be truncated during transmission.

In accordance with another aspect of the invention, a decoding operation is performed on the truncated embedded bit stream to obtain a reconstructed image.

In accordance with another aspect of the invention, decoding operations are successively performed on the embedded bit stream to obtain progressively improved reconstructed images as the bits arrive at the decoder.

One advantage of the present invention is that an improved method of transcoding from high rate to low rate bit streams is provided.

Another advantage of the present invention is that an entire vector representing an image can be losslessly encoded such that every prefix of the string is a valid code for the entire vector so that a receiver can use as much of the embedded bit stream as is necessary to reconstruct the image to a desired or allowable resolution.

Another advantage of the present invention is that this lossless encoding/decoding is accomplished using only table lookups.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement and/or combination, of the various parts and steps, whereby the objects contemplated are attained and hereinafter more fully set forth, specifically pointed out in the claims, and illustrated in the accompanying drawings in which:

DESCRIPTION OF THE PREFERRED EMBODIMENTS

Figure 2:
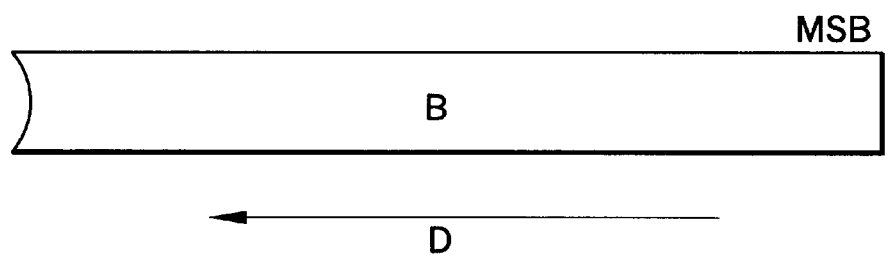
FIG. 2 shows a representation of an embedded bit stream.

A method of producing an embedded bit stream in a hierarchical table lookup vector quantizer is provided. The embedded bit stream has the property that at the highest rate, the reproduction of the underlying data is lossless. However, because the bits are arranged in order of importance and embedded such that any prefix of the bit stream is a valid bit stream of lower rate, the bit stream may be truncated at any point and a complete image reconstructed. FIG. 2 shows a representation of an embedded bit stream B having a most significant bit MSB suitably positioned. The bits decrease in importance in the stream along the direction identified by the arrow D.

A simple way to produce an embedded bit stream using hierarchical table lookup vector quantization is to replace the full search codebook embodied in the last table in the hierarchy by a tree-structured codebook. Then the index output from the table will be an embedded code. Thus the final table could output 16 bits per vector, for example, and the decoder could reproduce a codeword for any prefix of the 16 bit string. This approach to embedding in hierarchical table-lookup vector quantization is analogous to the approach to embedding in interband transform VQ taken by N. Chaddha, P. A. Chou, and T. H.-Y. Meng, "Scalable Compression based on Tree Structured Vector Quantization of Perceptually Weighted Block, Lapped, and Wavelet Transforms," Proc. IEEE Int'l Conf. on Image Processing, Oct. 23–26, Washington, DC, 1995, pp. 89–92.

While this approach is viable, it is limited in its utility, because the string size is limited to approximately 16 bits. Sixteen (16) bits per vector is a rather crude level of quantization. Some higher speed networks, for example, may only need to compress the data to 128 bits per vector. Lower capacity networks may tolerate only 4 bits per vector.

The present invention provides for encoding of an entire vector losslessly with a long string, such that every prefix of the string is a valid code. Furthermore, this is accomplished using only table lookups.

Accordingly, a long embedded code that losslessly codes data is produced using hierarchical table lookup vector quantization, as follows. For simplicity of discussion, it is assumed that each table is addressed with two 8-bit indices. A codebook at all stages, including the final stage, of a hierarchical table lookup vector quantizer is replaced with a tree-structured vector quantizer with the property that the leaves of the tree are in 1-1 correspondence with the entries in the corresponding table (of which there are typically 64 K). Such a tree can be designed using a variety of methods, discussed briefly below.

Because a tree-structured vector quantizer is used, any prefix of a path to a leaf represents a codeword. When the entire path to a leaf is transmitted to the decoder, then because the leaf corresponds to exactly one entry in the corresponding table, the inputs to the table are known exactly at the decoder. These inputs represent the outputs of the tables at the previous stage. Assuming that these tables also embody tree-structured vector quantizers whose leaves are in 1-1 correspondence with its entries, the output from each of these tables is the first 8 bits in the path map from the root to a leaf. Additional bits provide the remainder of the path map, and hence identify the leaf, and its corresponding entry, and hence identify the inputs to the table at that level. This procedure can be repeated all the way back up the hierarchy of table lookups to the input signal, which can be identified losslessly with sufficient numbers of bits. In the case that every tree-structured vector quantizer is fixed-rate (i.e., the trees are complete, with all its leaves at the same depth, in this case 16), then the number of bits in the longest embedded string is the number of bits in the input vector, in this case 8 times the vector dimension. For a vector dimension of 8×8 (typical in image coding), this is a string of length 8×8×8=512 bits. Any prefix of this string can be decoded to a level of quality appropriate for the length of the prefix.

A feature of the invention is that each table implements a many-to-one mapping (the quantizer) such that when supplemented with additional information, the mapping becomes invertible. This enables the decoder to work backwards up the hierarchy if it is given the additional information. It is important that the many-to-one mapping (the quantizer), by itself, represents the data with low distortion; although, of course, it cannot represent the data with zero distortion, since it is a many-to-one mapping. Thus one possibility is to design a fixed or variable rate tree-structured vector quantizer as usual for this mapping. This will ensure that the many-to-one mapping represents the data with as low a distortion as possible given that there can be only 256 possible outputs, for example.

Now, each leaf of the tree represents an output of the mapping, and therefore corresponds to the equivalence class of table entries with the same output. Each equivalence class has a certain size. For each equivalence class, a fixed or variable rate tree structure can be designed such that each leaf corresponds to an element of the class. Taken together, these tree structures define a one-to-one mapping between table entries (elements) and binary strings from an embedded code.

Figure 3:
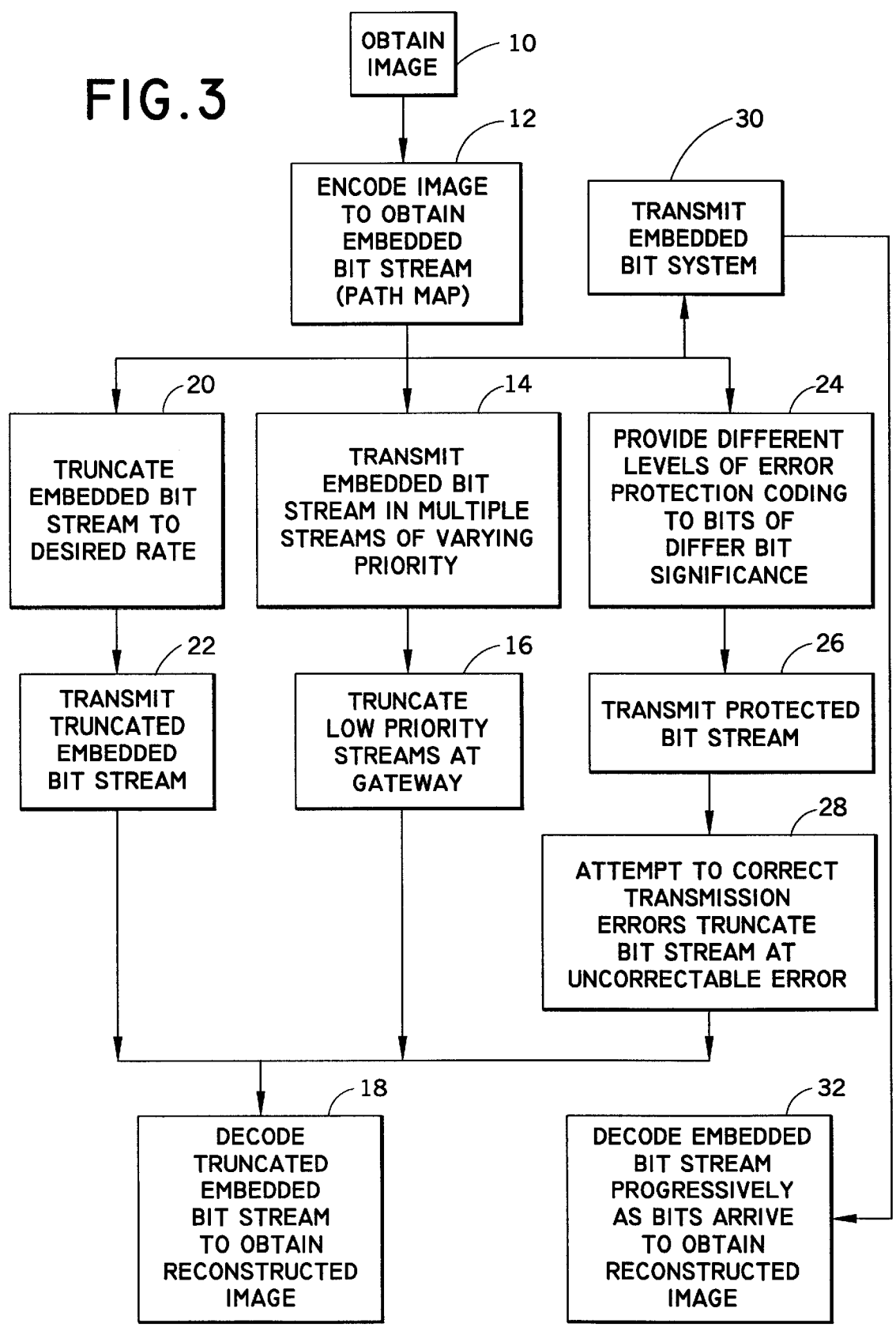
FIG. 3 is a flowchart generally representing the method according to the present invention.

In a typical application to bandwidth scalability in networks, as generally illustrated in FIG. 3, an 8-bit (monochrome) image is obtained (step 10) and encoded into an embedded bit stream that represents a path map (step 12). The bit stream is then transmitted in multiple streams of varying priority within the network, the low priority streams being subject to (step 14) being pruned away or truncated so that the higher priority streams can be transmitted over a lower bandwidth channel (step 16). The higher priority bit streams are then decoded into the reconstructed image (step 18).

Other applications—which may be implemented as an alternative or in addition to bandwidth scalability as described above—are also illustrated in FIG. 3. Steps 24, 26 and 28 illustrate unequal error protection. That is, after the image is encoded, different levels of error protection coding to bits of different significance are provided (step 24) and the protected bit-stream is transmitted (step 26). Transmission errors are then corrected and the bit stream is truncated at an uncorrectable error (step 28). The truncated bit stream is then decoded to obtain a reconstructed image (step 18).

Rate control at the encoder is represented in FIG. 3. More particularly, after the image is encoded at step 12, the resultant embedded bit stream is truncated to a desired rate (step 20) and the truncated bit stream is transmitted (step 22). The truncated bit stream is then decoded and the reconstructed image is obtained (step 18).

Progressive transmission is also shown. After the image is encoded, the resultant embedded bit stream is transmitted (step 30). The transmitted embedded bit stream is then decoded progressively as bits arrive at the receiver to obtain the reconstructed image (step 32).

As those skilled in the art will appreciate, the encoding and decoding processes involve the use of codebooks and corresponding tables which are constructed based on the codebooks. Identical sets of codebooks are respectively available at both the transmitting and receiving ends of the transmission of the embedded bit stream (path map) while the corresponding tables are only used at the transmitting end in the preferred embodiment. It is to be further appreciated that the memory chips utilized to store the codebooks and tables are preferably read only memory (ROM's). However, it is recognized that other suitable memory means such as PROM, EPROM, EEPROM, RAM, etc. may be utilized.

As those skilled in the art will further appreciate, the method as described herein may be implemented in any suitable hardware configuration and/or by any suitable control scheme. In the preferred embodiment, the hardware configuration comprises a general purpose computer adapted to facilitate the present invention. For example, suitable tables are configured in memory and buffers are established. The preferred control scheme is software based and includes instructions written in the C language. It is contemplated that various control procedures in various mediums could be used.

The details of how 1) the codebooks and tables are constructed, 2) the image is encoded into an embedded bit stream, and 3) the truncated bit stream is decoded into the reconstructed image, will now be more particularly described.

Construction of Codebooks and Tables

Figure 4A:
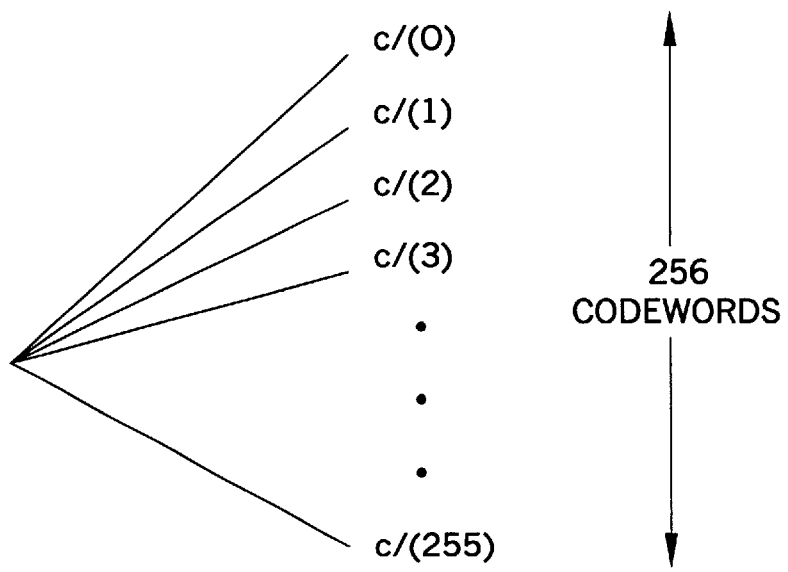
FIGS. 4a and 4b collectively represent the structure of an extended tree-structured codebook at levels 1–5 according to the present invention.

For purposes of explanation, the image will be coded in 8×8 blocks, so that six levels of codebooks and tables will be required, l=1,2,3,4,5,6, corresponding to vector dimensions 2×1, 2×2, 4×2, 4×4, 8×4, and 8×8, respectively. For the first five of these levels, codebooks and tables are designed in the usual, known way for hierarchical table-lookup vector quantization, as described for example in P. -C. Chang, J. May, and R. M. Gray, "Hierarchical Vector Quantization with Table-Lookup Encoders," Proc. Int'l. Conf. on Communications, Chicago, Ill., June 1985, pp. 1452–55. That is to say, the codebook at level l (l=1,2,3,4,5) is a regular full-search vector quantization codebook with 256 $2^L$-dimensional codewords, say $c_\pm(i)$, i=0, . . . ,255. A representation of a codebook for levels 1–5 is shown in FIG. 4a. The table at level 1(l=1,2,3,4,5) contains in its (j,k)th entry the index i of the codeword $c_\pm(i)$ to which the $2^l$-dimensional vector $(c_{\pm-1}(j),c_{\pm-1}(k))$ is quantized by the full-search vector quantizer at level 1.

Figure 5A:
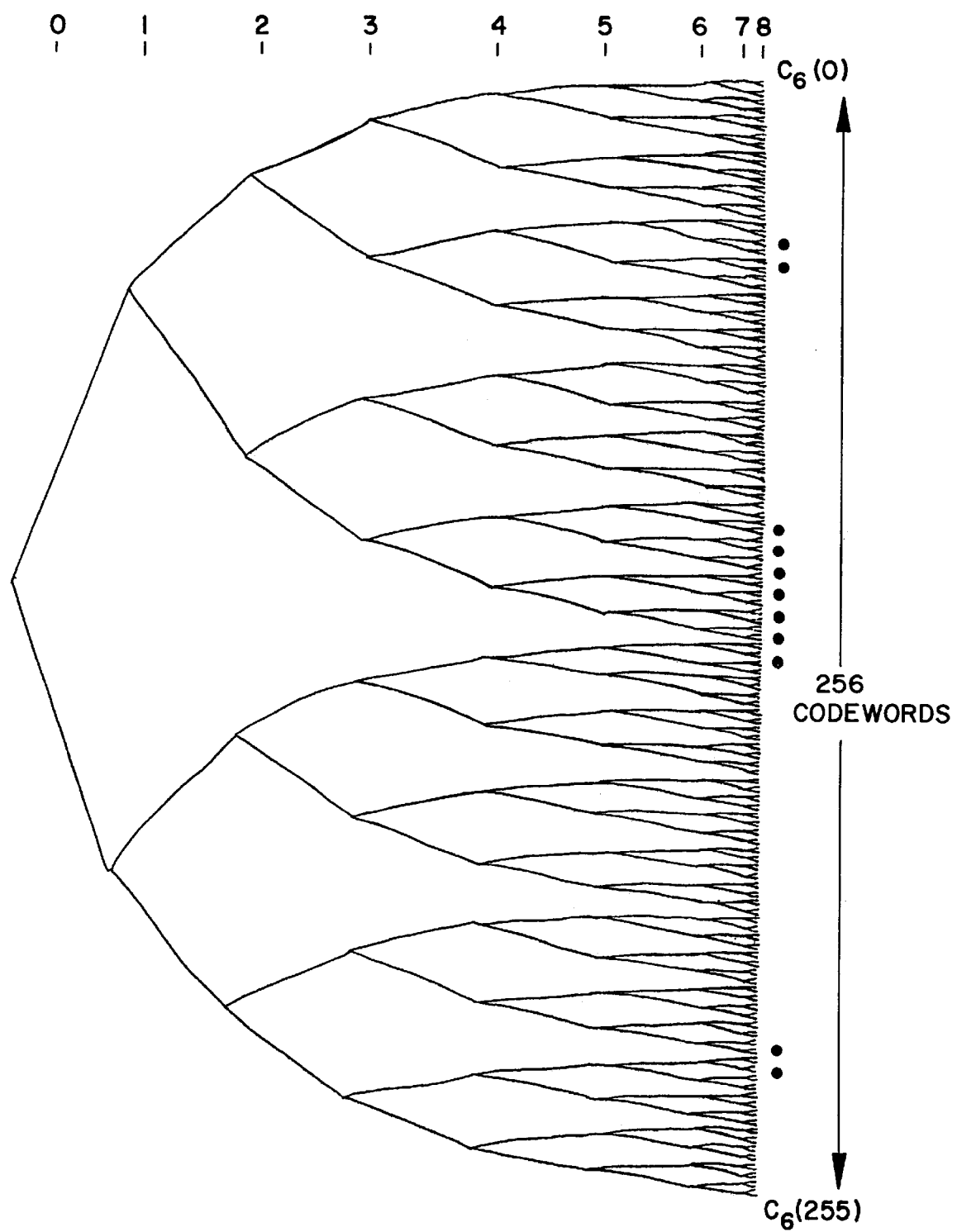
FIGS. 5a and 5b collectively represent the structure of an extended tree-structured codebook at level 6 according to the present invention.

For the last level 1 (l=6), the codebook and table are designed differently. The codebook is designed as a binary tree-structured codebook with depth 8, as described for example in A. Gersho and R. M. Gray, "Vector Quantization and Signal Compression," Kluwer Academic Publishers, 1992, and shown in FIG. 5a. The table is constructed to contain in its (j,k)th entry the index i (actually, the 8-bit binary path map) of the codeword $c_\pm(i)$ to which the 2-dimensional vector $(c_{\pm-1}(j),c_{\pm-1}(k))$ is quantized by the tree-structured vector quantizer.

Figure 4B:
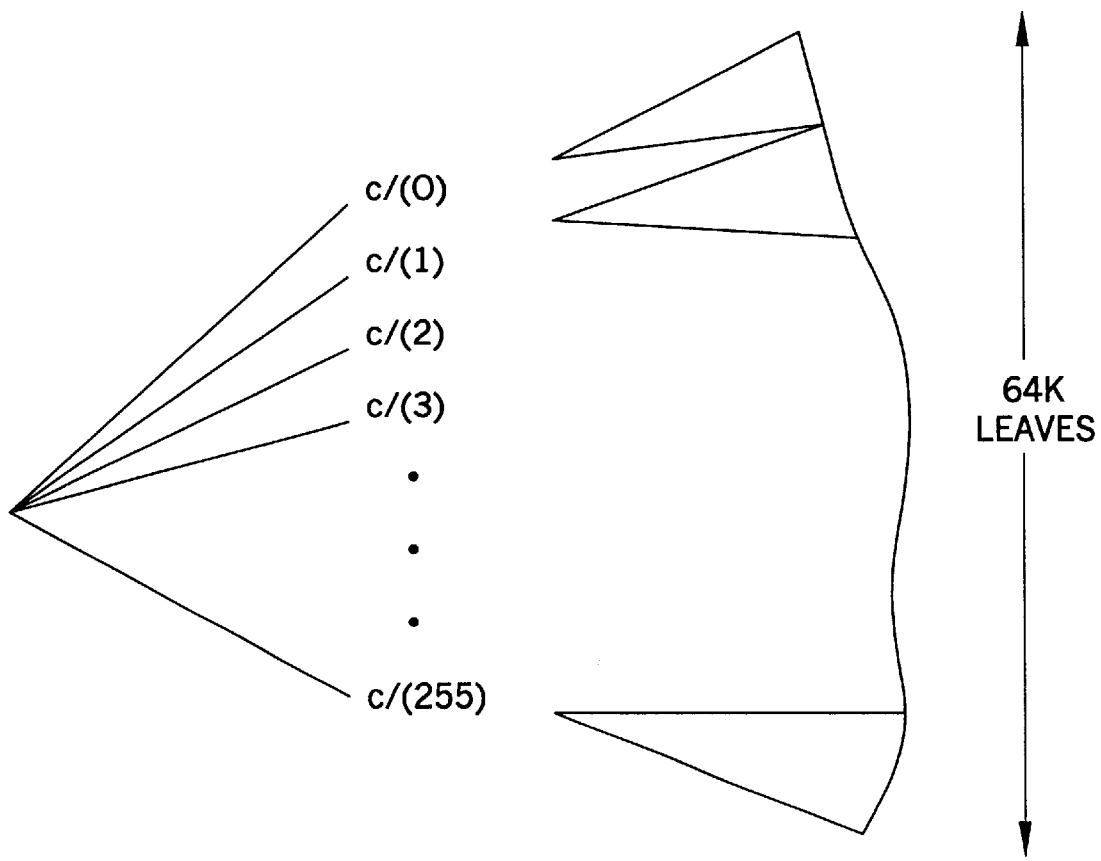
Figure 5B:
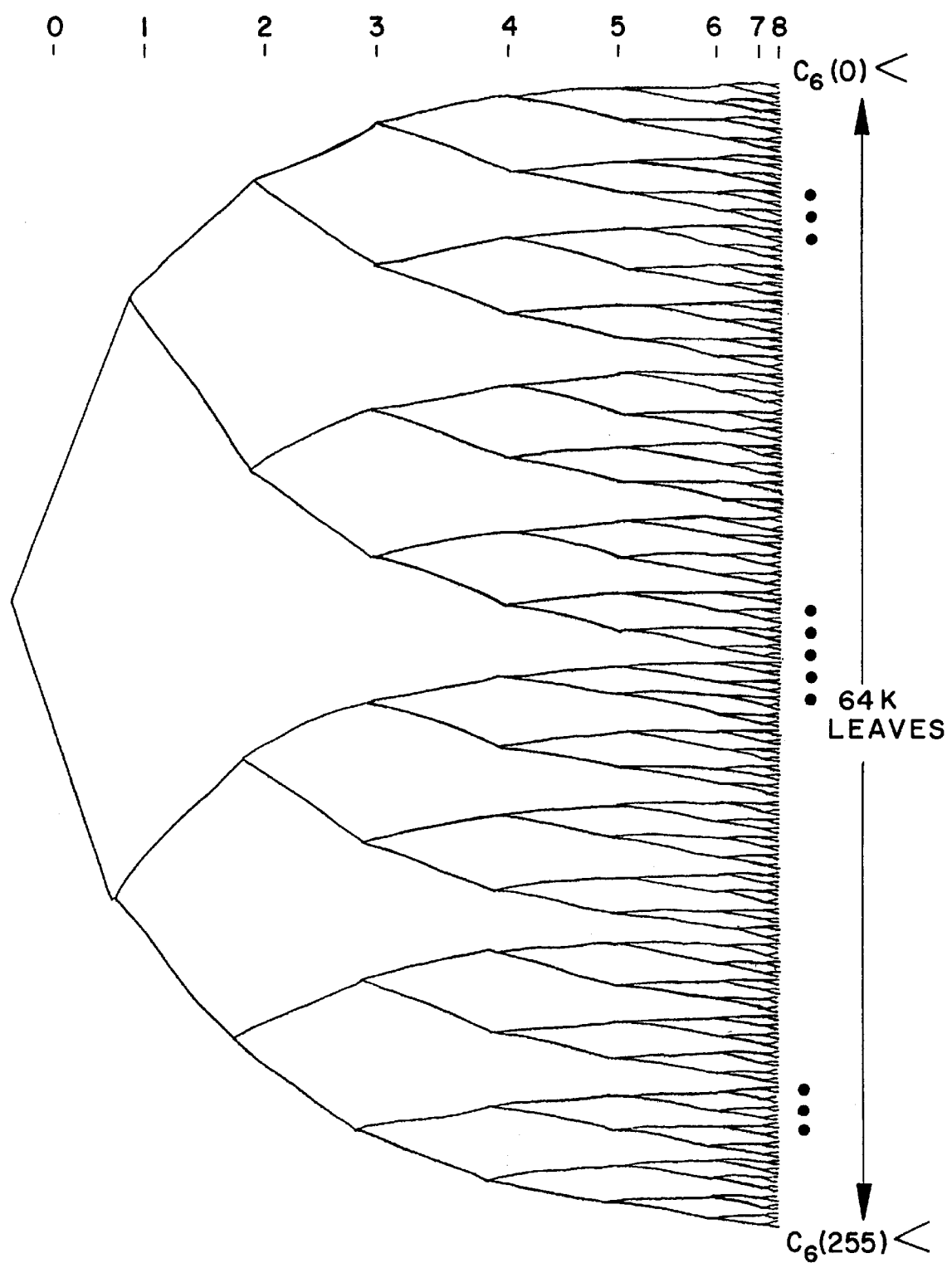

As illustrated in FIGS. 4b and 5b, according to the present invention and beyond the above described processes, the codebook at each level 1 (l=1,2,3,4,5,6) is extended into a variable-length tree-structured vector quantizer by growing a binary tree from each codeword $c_\pm(i)$, i=0, . . . , 255, in the codebook at that level. This is accomplished by quantizing a training sequence with the codebook at level 1-1, pairing the quantized $2^{l-1}$-dimensional vectors into $2^l$-dimensional vectors, and then using the resulting sequence as a training set to grow the quantizer at level 1 into a variable-length tree-structured vector quantizer with the maximum number of leaves, as shown in FIGS. 4b and 5b. Since there are only 64K possible $2^l$-dimensional vectors in the quantized training sequence, there will be at most 64K leaves of the maximal tree. The leaves of the binary subtree emanating from codeword $c_\pm(i)$ correspond to those indices (j,k) that map to index i at level 1.

Figure 6:
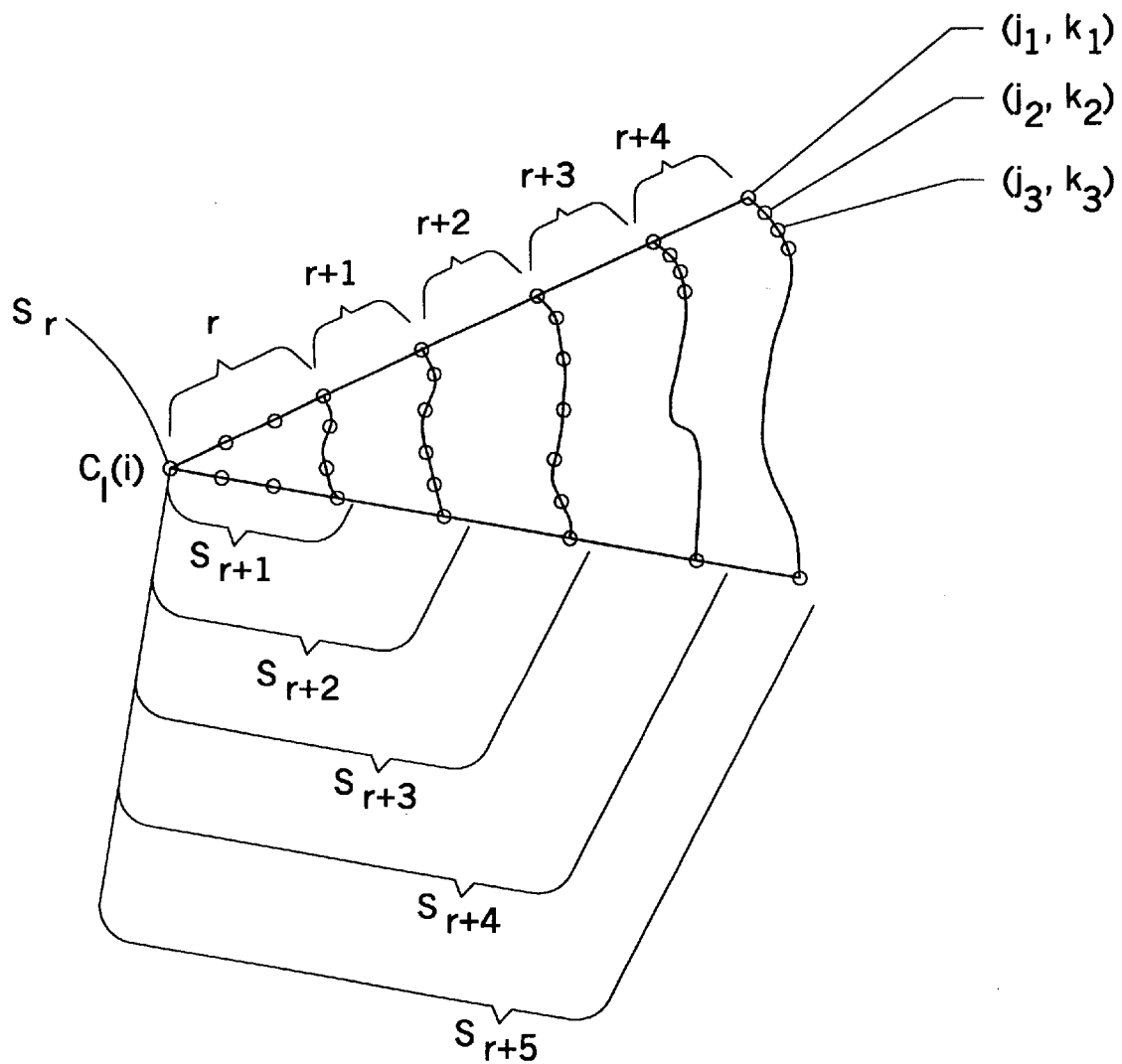
FIG. 6 represents a binary tree that extends from each of the codewords of FIGS. 4b and 5b.

Each node of the maximal tree is labeled with its codeword, as usual. In addition, as shown in FIG. 6—which illustrates an exemplary binary tree emanating from codewords $c_\pm(i)$ of FIGS. 4b and 5b—each leaf of the tree is labeled with its corresponding (j,k) pair, and each internal node of the tree is labeled with a "refinement index"—r, r+1, r+2, r+3, r+4. The refinement index is an integer that indicates the perceptual significance of the bit in the path map that emanates from the node. Refinement indices range from 0 to N−1, where N is the number of refinements desired in the embedded bit stream. Bits with refinement index 0 are most significant, while bits with refinement index N−1 are least significant. Thus the refinement indices are non-decreasing along paths from the root of a tree to its leaves. Furthermore, the refinement indices in the tree at level 1-1 will tend to be higher than the refinement indices in the tree at level 1. In fact, the refinement indices of the nodes near the root of the tree at level 6 will be 0, while the refinement indices of the nodes near the leaves of the tree at level 1 will be N−1. Bits are placed into the embedded bit stream in order of their refinement indices.

Although a wide variety of ways could be used, one way to compute the refinement indices is as follows. A set of N+1 Lagrange multipliers $\lambda_0, \lambda_1, \ldots, \lambda_N$, is chosen such that $\infty = \lambda_0 < \lambda_1 < \lambda_2 < \ldots < \lambda_N = 0$. Then the tree is pruned at each level to each Lagrange multiplier. (The pruning procedure is the generalized BFOS algorithm and can be found for example in A. Gersho and R. M. Gray, "Vector Quantization and Signal Compression," Kluwer Academic Publishers, 1992.) For the tree at any given level, this produces a set of nested pruned subtrees, say $S_0 \leq S_1 \leq S_2 \leq \ldots \leq S_N$ such that $S_0$ contains only the root node and $S_N$ is the maximal tree. A node is then labeled by refinement index r if the node is an internal node of $S_{\pm+1}$, but not an internal node of $S_\pm$. In addition, each of these nested subtrees $S_0, \ldots, S_{r+1} \ldots S_{N-1}, S_N$ corresponds to the multipliers $\lambda_0, \ldots \lambda_r, \lambda_{r+1}, \ldots \lambda_{N-1}, \lambda_N$.

Just as the codebooks are extended, the tables are extended. The (j,k)th entry of the table at level 1 contains the 8-bit index i of the codeword c+(i) in the codebook at level 1. The (j,k)th entry in the table is extended to include the path map $b_1 b_2 b_3 \ldots b_{\text{len}}$ from the node containing $c\_(_i)$ to the leaf labeled (j,k). The length len of this path map varies with (j,k). Also included in the (j,k)th entry is the sequence of refinement indices $r_1 r_2 r_3 \ldots r_{\text{len}}$ along the path map. The extended table at level 1 is substantially of the form as follows:

| | | | | |
|---|---|---|---|---|
| (0, 0) | i | len | $b_1 b_2 b_3 \ldots b_{\text{ten}}$ | $r_1 r_2 r_3 \ldots r_{\text{ten}}$ |
| (0, 1) | | | | |
| (0, 2) | | | | |
| . | . | . | . | . |
| . | . | . | . | . |
| . | . | . | . | . |
| (255, 255) | | | | |

Encoding

The encoding operation comprises performing hierarchical table lookup vector quantization wherein a fixed tree data structure is utilized for at least two quantization levels and embedding resultant data by selecting bits from at least two levels of the fixed tree data structure to obtain a first bit stream having a first rate representing the image. A selected prefix of the first bit stream comprises a second bit stream representing the image at a second rate.

More particularly, to encode an image, N buffers are established, labeled 0 through N−1. The rth buffer will contain all the bits with refinement index r.

Figure 1A:
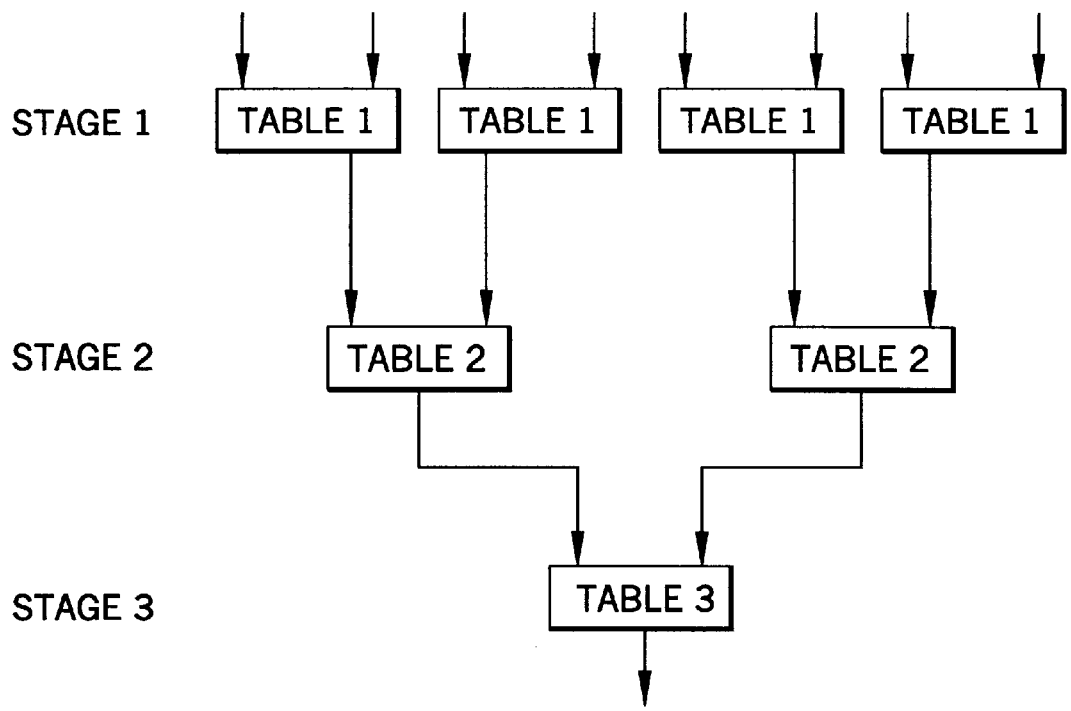
FIGS. 1a and 1b illustrate a known approach for hierarchical table-lookup vector quantization.
Figure 1B:
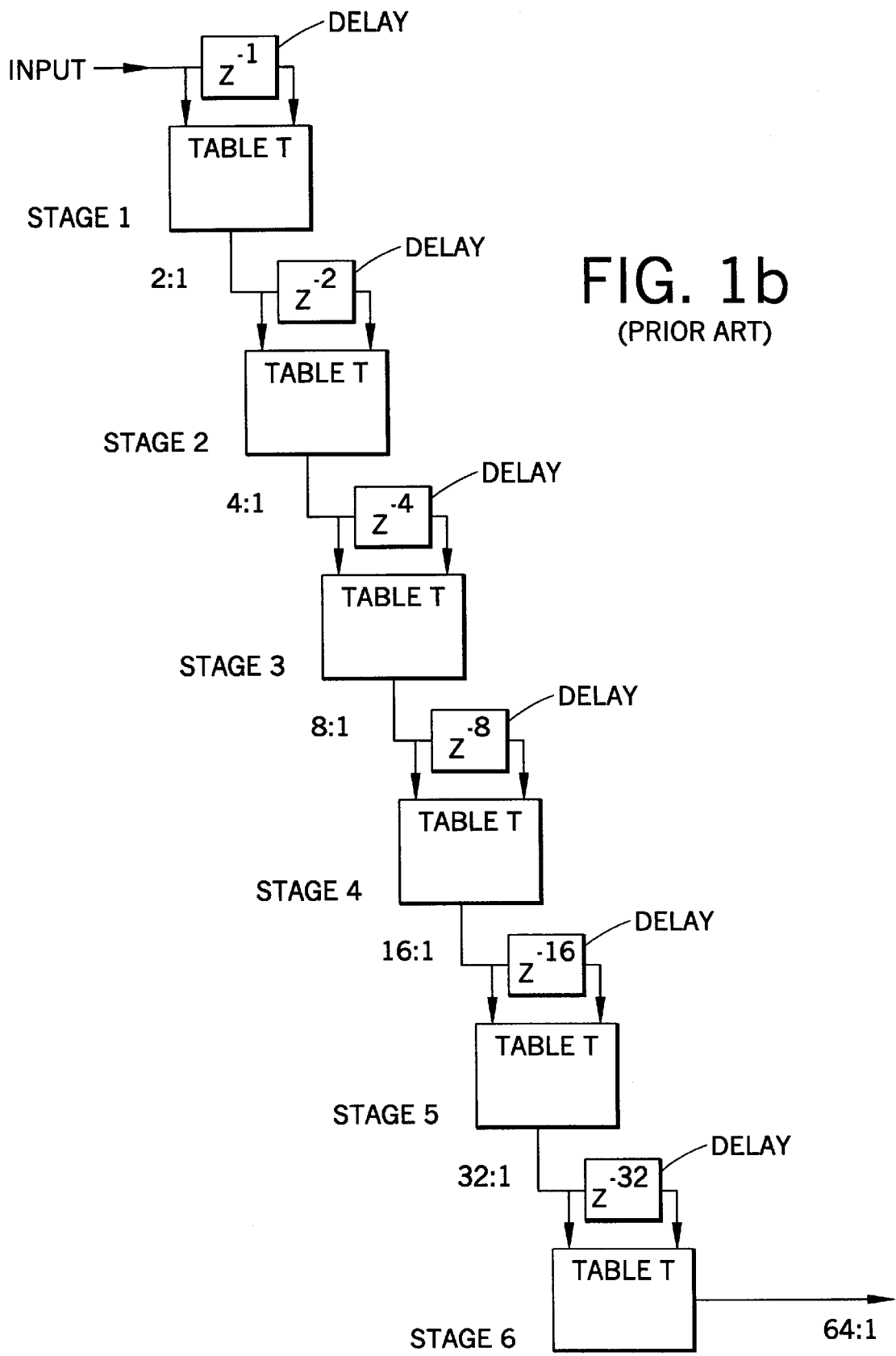
Figure 7:
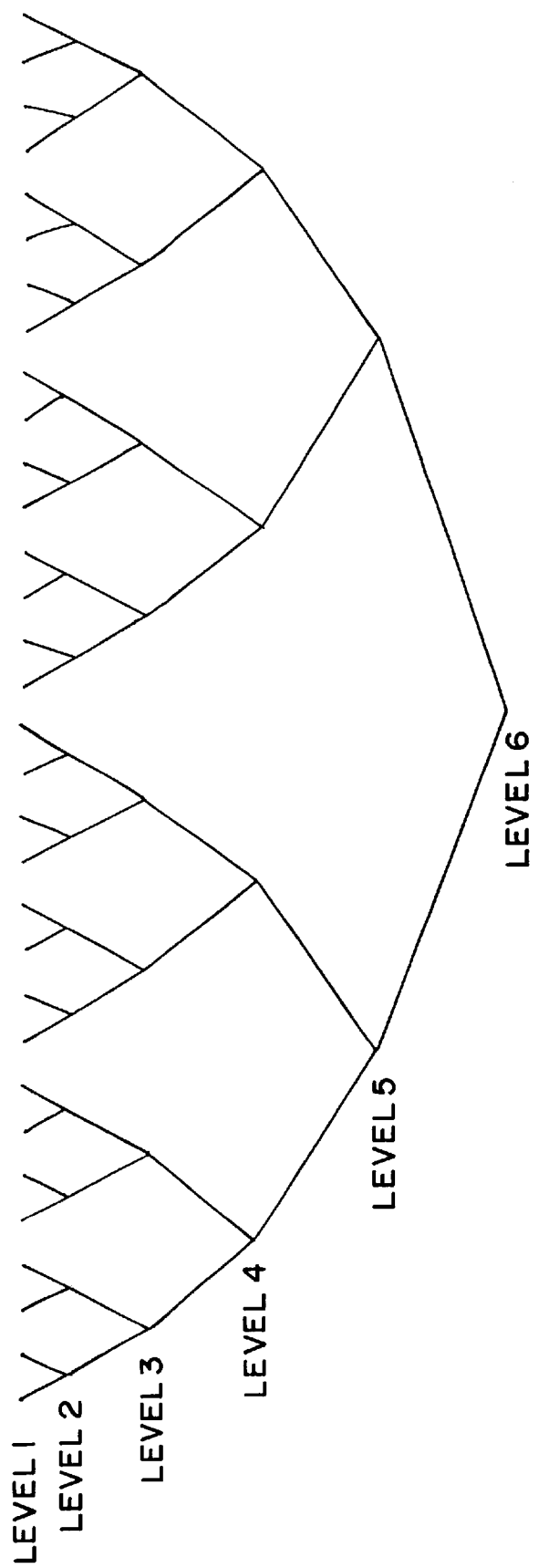
FIG. 7 shows a data structure for encoding according to the present invention.

Next, each 8×8 block of the image is evaluated, in turn. For each 8×8 block, the block is encoded using ordinary HVQ, down to 6 levels. The HVQ process is generally described in connection with FIGS. 1a and 1b. As the encoding proceeds, however, the fixed data structure shown in FIG. 7 is filled in.

As shown, this data structure is a tree structure and has 32 nodes at level 1, 16 nodes at level 2, and so forth, down to a single node at level 6. The nth node at level 1 corresponds to the nth subblock of dimension $2\_^1$ within the 8×8 block. At some time during the ordinary HVQ encoding process, this subblock will be encoded into an index i by looking up the (j,k)th entry in the table at level 1. At that time, the information (len, $b_1 b_2 b_3 \ldots b_{len}$, $r_1 r_2 r_3 \ldots r_{len}$) from the (j,k)th entry in the extended table at level 1 should be copied into the nth node at level 1 in the data structure above.

Once the nodes in the data structure are completely filled in, the bits $\{b_m\}$ in this data structure are put into the N buffers according to their associated refinement indices $\{r_m\}$ as follows. For refinement index r going from 0 to N−1, the following recursive procedure is performed, beginning with the root node of the structure: embed(rootnode,r).

The definition of the embed procedure is the following:

```
embed (node,r) {
    for m=1 to node.len do
        if node.b[m] is marked as already output then
            continue
        else if node.r[m] <= r then
            output node.b[m] to buffer r
            mark node.b[m] as having been output
        else if node.r[m] > r then
            return
    if node is not at level 1, then
        embed(leftsubnode,r)
        embed(rightsubnode,r)
}
```

This procedure outputs all bits in the node up through refinement index r, if they haven't been output already. When all the bits in the node have been exhausted, then the procedure is called on the left and right subnodes.

When the refinement index reaches N, then the bits at all refinement levels have been output for this block. The remaining blocks are processed in a similar way. When all the blocks have been processed, the buffers containing the bits at the various refinement levels may be concatenated together into one long embedded bit stream, or they may be stored in individual files, transmitted through individual channels with different levels of error protection, etc.

Figure 8:
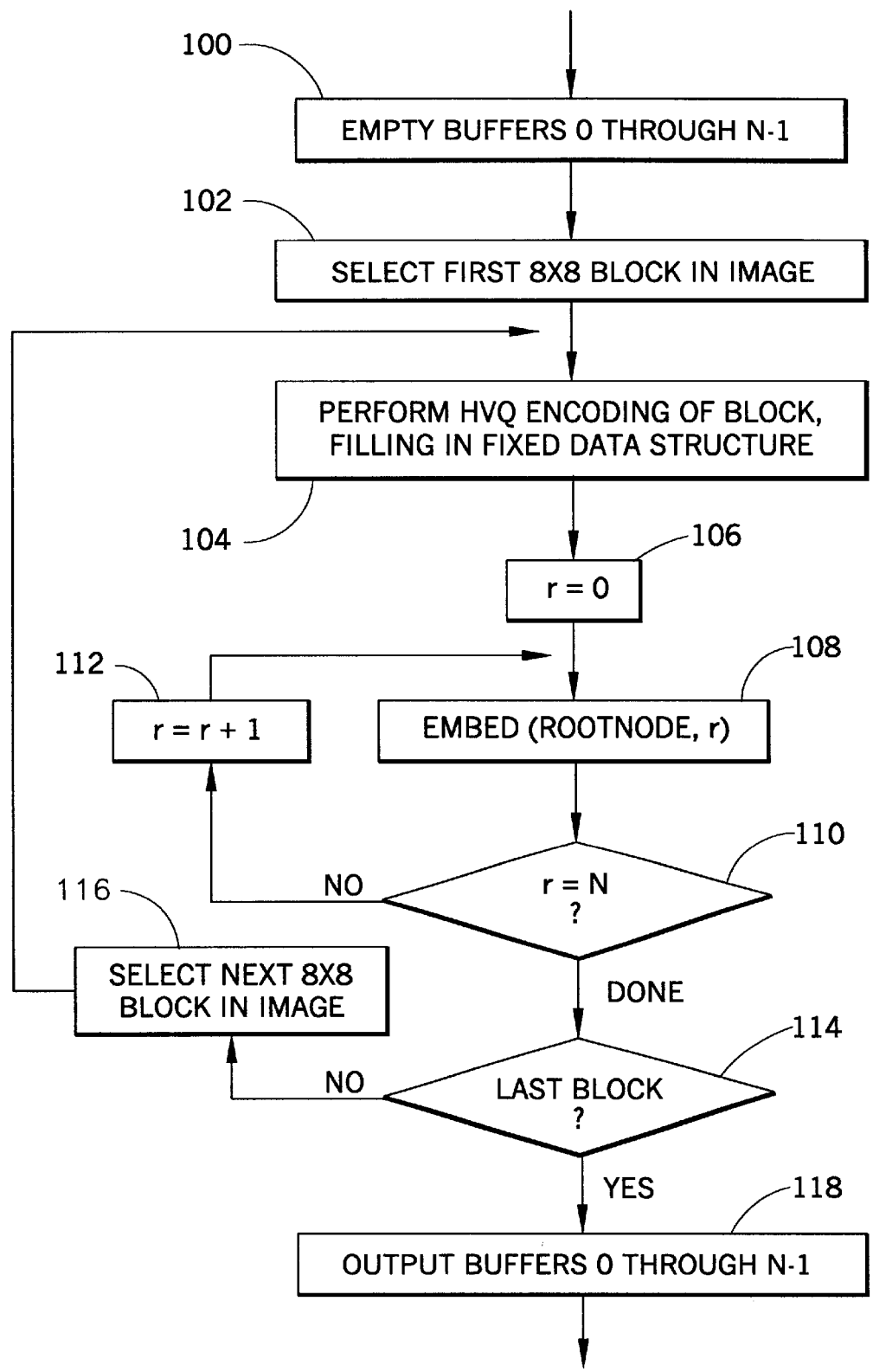
FIG. 8 is a flowchart illustrating the encoding procedure of the present invention; and, FIG. 9 is a flowchart illustrating the decoding procedure of the present invention.

A flow chart of the encoding procedure is shown in FIG. 8. Initially, buffers 0 through N−1 are emptied (step 100) and an 8×8 block of the image to be transmitted is selected (step 102). Hierarchial vector quantization of the block, filling in the data structure of FIG. 7, is performed (step 104). Refinement index r is next set to zero (0) (step 106). The recursive embedding procedure described above is performed (step 108) and a determination is made whether r=N (step 110).

If r≠N, then r is incremented (step 112) and the embedding procedure (step 108) and (step 110) are again performed. If r=N, a determination is made whether the 8×8 block encoded is the last block of the total image (step 114). If the 8×8 block is not the last block, then the next 8×8 block is selected (step 116) and steps 104–114 are performed. If the 8×8 block is the last block of the image, then the contents of buffers 0 through N−1 are output (step 118). The contents of these buffers thus represent the embedded bit stream, or path map, that is transmitted to a receiver, truncated, and decoded to reconstruct the encoded image.

Decoding

The decoding operation comprises recovering a selected number of buffers, decoding contents of the recovered buffers by following path maps through the fixed tree data structure to leaves of the tree structure at which are stored portions of the image to reconstruct the image, and outputting the reconstructed image.

To that end, the codebooks can be used for decoding an image. For simplicity, it will be assumed that the buffers for the different refinement levels (0 through N−1) have been stored in individual files, or have been transmitted through individual channels, so that they can be recovered before any decoding is done. This allows the image to be decoded in a single pass through its 8×8 blocks. If the buffers have been concatenated into one long embedded bit stream, then the image must be decoded in multiple passes. Each pass reads more bits from the embedded bit stream and progressively enhances the image.

Figure 9:
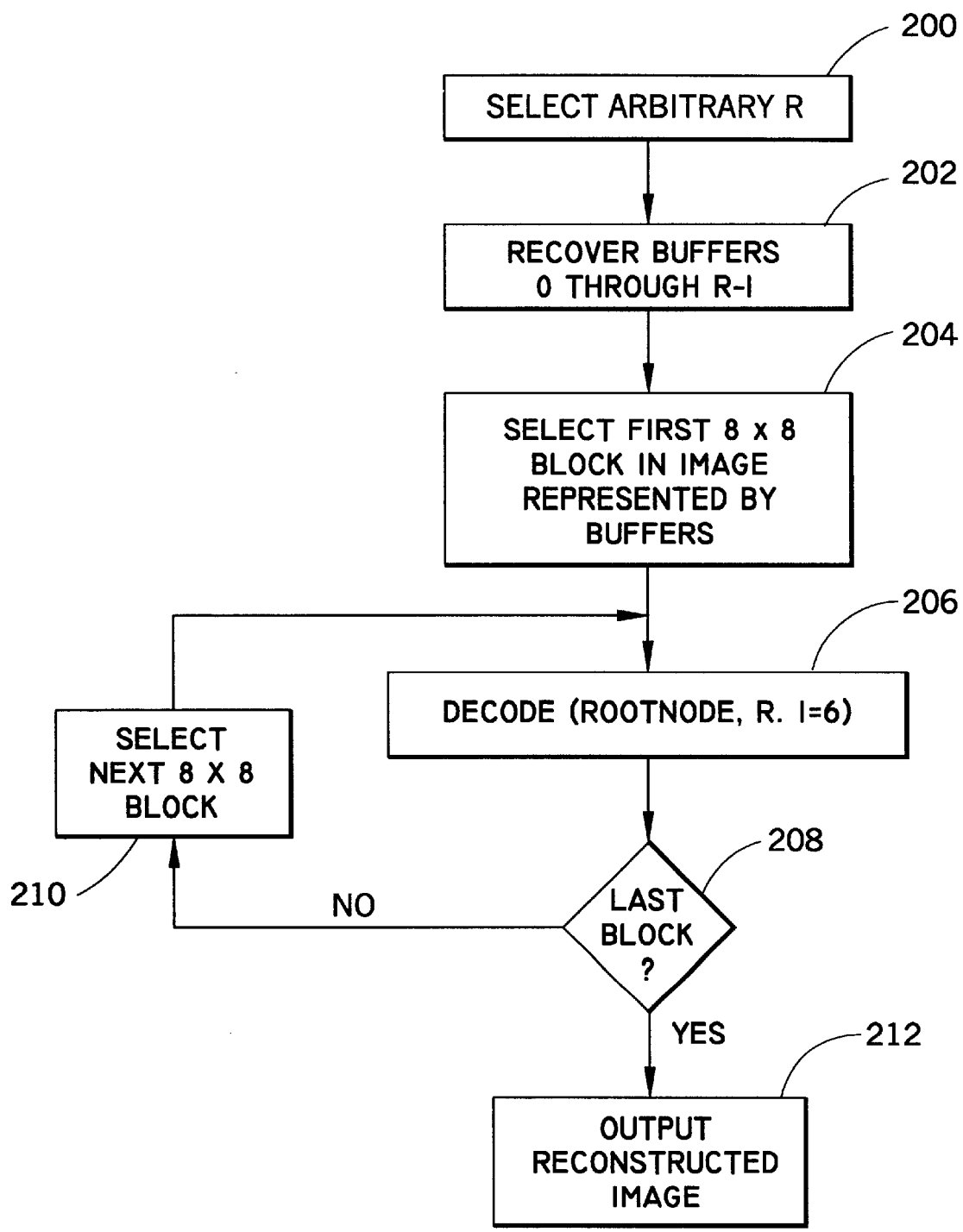

Referring now to FIG. 9, the truncation, decoding and reconstruction are illustrated in the flowchart therein. First, an arbitrary number R is selected according to the available bandwidth for the receiver (step 200). The last of these N buffers may thus be truncated. This is equivalent to taking an arbitrary prefix of the embedded bit stream. The first R of the original N buffers, labeled 0 through R−1, are then recovered (step 202).

A first 8×8 block of the image is selected (step 204) and decoded according to the following procedure, starting with the root node of the codebook at level 6, and r=R:

```
decode(node,r,level) {
    while node is not a leaf do
        if node.r (the node's refinement index) > r then
            output node.c (the node's codeword)
            return
        if buffer node.r is empty, return
        read a bit out of buffer node.r
        if the bit is zero then
            node = left subnode (i.e., go left)
        else node = right subnode (i.e., go right)
    We're at a leaf. Get its labels (j,k)
    if level = 1 then
        output pixel values j,k
        return
    decode(rootnode of jth subtree at level l−1,r,l−1)
    decode(rootnode of kth subtree at level l−1,r,l−1)
}
```

A determination is then made as to whether the last block of the image has been decoded (step 208). If the last block has not been decoded, the next 8×8 block is selected (step 210) and steps 206 and 208 are repeated. If the last block has been decoded, the reconstructed image is output (step 212).

Thus, an image can be encoded, transmitted, and reconstructed to a variety of different resolutions. This variety of resolutions includes that resolution representing a lossless transmission.

The above description only provides a disclosure of the particular embodiments of the invention and is not intended for the purpose of limiting the same thereto. As such, the invention is not limited only to the above described embodiments. Rather, it is recognized that one skilled in the art could conceive alternative embodiments that fall within the scope of the invention.

Having thus described the invention, we now claim:

1. A transmission method for image data, the method comprising the steps of:
   receiving an image;
   performing an encoding operation on the image comprising performing hierarchical table lookup vector quantization wherein a fixed tree data structure is utilized for at least two quantization levels and embedding resultant data by selecting bits from at least two levels of the fixed tree data structure to obtain a first bit stream having a first rate representing the image, a selected prefix of the first bit stream comprising a second bit stream representing the image at a second rate;

transmitting one of the first bit stream and the second bit stream; and, successively performing a decoding operation on one of the first bit stream and the second bit stream to obtain a reconstructed image.

2. The method as set forth in claim 1 further comprising storing the first bit stream in buffers during the encoding.

3. The method as set forth in claim 2 wherein the decoding operation comprises recovering a selected number of the buffers, decoding contents of the recovered buffers by following path maps through the fixed tree data structure to leaves of the tree structure at which are stored portions of the image to reconstruct the image, and outputting the reconstructed image.

4. The method as set forth in claim 1 wherein the first bit stream is a lossless bit stream.

5. The method as set forth in claim 1 wherein the second bit stream comprises the first bit stream.

6. An apparatus comprising:

means for receiving an image;

means for performing an encoding operation on the image comprising performing hierarchical table lookup vector quantization wherein a fixed tree data structure is utilized for at least two quantization levels and embedding resultant data by selecting bits from at least two levels of the fixed tree data structure to obtain a first bit stream having a first rate representing the image, a selected prefix of the first bit stream comprising a second bit stream representing the image at a second rate;

means for transmitting one of the first bit stream and the second bit stream; and, means for successively performing a decoding operation on one of the first bit stream and the second bit stream to obtain a reconstructed image.

7. The apparatus as set forth in claim 6 further comprising buffers for storing the first bit stream during the encoding.

8. The apparatus as set forth in claim 7 wherein the means for decoding comprises means for recovering a selected number of the buffers, decoding contents of the recovered buffers by following path maps through the fixed tree data structure to leaves of the tree structure at which are stored portions of the image to reconstruct the image, and outputting the reconstructed image.

9. The apparatus as set forth in claim 6, wherein the first bit stream is a lossless bit stream.

10. The apparatus as set forth in claim 6 wherein the second bit stream comprises the first bit stream.

11. An apparatus comprising:

a first codebook based on hierarchical table lookup vector quantization having a predetermined number of first codewords to be accessed by a full search of the first codebook;

a second codebook that is provided with a first tree structure with a predetermined depth having a predetermined number of second codewords accessed based on a binary path map based on the first tree structure;

second tree structures grown from each first and second codeword;

tables based on the first and second codebooks;

means for performing an encoding operation on an image comprising performing hierarchical table lookup vector quantization wherein the tables are accessed and a third tree structure to store data is utilized for at least two quantization levels and embedding resultant data by selecting bits from at least two levels of the fixed tree data structure to obtain a first bit stream having a first rate representing the image, a selected prefix of the first bit stream comprising a second bit stream representing the image at a second rate; and, means for performing at least one of
1) truncating the first bit stream to obtain the second bit stream and transmitting the second bit stream,
2) transmitting the first bit stream in a manner representing a plurality of bit streams of varying priority and truncating low priority bit streams of the plurality to obtain the second bit stream,
3) providing different levels of error protection coding to bits of differing significance in the first bit stream, transmitting the first bit stream with the error protection coding, attempting to correct transmission errors in the first bit stream, and truncating the first bit stream at an uncorrectable error based on the error protection coding to obtain the second bit stream, and,
4) transmitting the first bit stream.

12. The apparatus as set forth in claim 11 further comprising:

means for successively performing a decoding operation on one of the first bit stream and the second bit stream by following path maps through the fixed tree data structure to leaves of the tree structure at which are stored portions of the image to obtain a reconstructed image.

13. A transmission method for image data, the method comprising the steps of:

receiving an image;

performing an encoding operation on the image comprising performing hierarchical table lookup vector quantization wherein a fixed tree data structure is utilized for at least two stages and embedding resultant data by selecting bits from at least two levels of the fixed tree data structure to obtain a first bit stream having a first rate representing the image, a selected prefix of the first bit stream comprising a second bit stream representing the image at a second rate;

transmitting one of the first bit stream and the second bit stream; and, successively performing a decoding operation on one of the first bit stream and the second bit stream to obtain a reconstructed image.

14. An apparatus comprising:

means for receiving an image;

means for performing an encoding operation on the image comprising performing hierarchical table lookup vector quantization wherein a fixed tree data structure is utilized for at least two stages and embedding resultant data by selecting bits from at least two levels of the fixed tree data structure to obtain a first bit stream having a first rate representing the image, a selected prefix of the first bit stream comprising a second bit stream representing the image at a second rate;

means for transmitting one of the first bit stream and the second bit stream; and, means for successively performing a decoding operation on one of the first bit stream and the second bit stream to obtain a reconstructed image.

* * * * *